(12) United States Patent
Earnshaw et al.

(10) Patent No.: US 9,143,255 B2
(45) Date of Patent: Sep. 22, 2015

(54) ORTHOGONAL SIGNALING FOR CDMA

(75) Inventors: Mark Earnshaw, Nepean (CA); Eman A. Fituri, Nepean (CA); Gamini Senarath, Nepean (CA); David G. Steer, Nepean (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 4032 days.

(21) Appl. No.: 10/273,965

(22) Filed: Oct. 18, 2002

(65) Prior Publication Data
US 2004/0081113 A1    Apr. 29, 2004

(51) Int. Cl.
*H04J 11/00* (2006.01)
*H04J 13/00* (2011.01)

(52) U.S. Cl.
CPC ........... *H04J 11/0023* (2013.01); *H04J 13/004* (2013.01)

(58) Field of Classification Search
CPC ............................ H04J 11/0023; H04J 13/004
USPC ......... 370/320, 321, 341, 342, 344, 345, 335, 370/336, 479, 208; 375/130
See application file for complete search history.

(56) References Cited

U.S. PATENT DOCUMENTS

| | | | | |
|---|---|---|---|---|
| 5,910,950 A * | 6/1999 | ten Brink | ....................... | 370/342 |
| 5,940,434 A * | 8/1999 | Lee et al. | ....................... | 375/146 |
| 6,091,757 A * | 7/2000 | Cudak et al. | ................... | 375/130 |
| 6,233,231 B1 * | 5/2001 | Felix et al. | ..................... | 370/335 |
| 6,330,247 B1 * | 12/2001 | Chang et al. | ................... | 370/442 |
| 6,421,336 B1 * | 7/2002 | Proctor et al. | ................. | 370/342 |
| 6,580,747 B1 * | 6/2003 | Lipponen | ....................... | 375/140 |
| 6,697,347 B2 * | 2/2004 | Ostman et al. | ................. | 370/335 |
| 6,711,384 B2 * | 3/2004 | Kubo et al. | ...................... | 455/68 |
| 6,879,576 B1 * | 4/2005 | Agrawal et al. | ............... | 370/342 |
| 6,885,653 B2 * | 4/2005 | Choi et al. | ..................... | 370/342 |
| 7,180,861 B2 * | 2/2007 | Janczak | ........................ | 370/235 |
| 7,539,124 B2 * | 5/2009 | Rhim et al. | .................... | 370/208 |
| 7,555,216 B2 * | 6/2009 | Yoshino et al. | ................. | 398/77 |
| 2002/0003786 A1 * | 1/2002 | Kim et al. | ...................... | 370/335 |
| 2003/0072277 A1 * | 4/2003 | Subrahmanya et al. | ....... | 370/320 |
| 2003/0081538 A1 * | 5/2003 | Walton et al. | ................. | 370/206 |
| 2004/0037291 A1 * | 2/2004 | Attar et al. | ................... | 370/395.4 |
| 2004/0071115 A1 * | 4/2004 | Earnshaw et al. | ............. | 370/335 |
| 2005/0117535 A1 * | 6/2005 | Mahonen | ....................... | 370/328 |
| 2005/0117548 A1 * | 6/2005 | Cam | ............................. | 370/335 |

OTHER PUBLICATIONS

Ottosson et al., "Toward 4G IP-based Wireless Systems: A Proposal for the Uplink," Wireless World Research Forum Workshop, Phoenix, Arizona, Mar. 2002.

* cited by examiner

*Primary Examiner* — Chuong T Ho
(74) *Attorney, Agent, or Firm* — Brandon Roper; Judy Yee; Micky Minhas (57) ABSTRACT

The present invention uses a portion of an orthogonal spreading code space in a CDMA spectrum for uplink from a user element to a base station. By assigning the user elements one or more codes, which are orthogonal to those used to spread data, to use for uplink, the present invention significantly reduces interference between channels, and between the data channels and the channels, while supporting additional capacity. The codes may be individually assigned to user elements or assigned to groups of user elements. Further, different length codes may be assigned to the user elements to support different rates depending on Quality of Service (QoS) requirements.

40 Claims, 6 Drawing Sheets

ORTHOGONAL SIGNALING FOR CDMA

CROSS-REFERENCE TO RELATED APPLICATIONS

This U.S. patent application is related to concurrently filed U.S. patent application Ser. No. 10/273,838, filed on Oct. 18, 2002, entitled ORTHOGONAL SIGNALING FOR CDMA by Earnshaw et al., the disclosure of which is incorporated herein by reference in its entirety.

FIELD OF THE INVENTION

The present invention relates to wireless communications, and in particular to minimizing interference between signaling and data channels in a code division multiple access wireless communication system by providing orthogonality to both signaling and data channels.

BACKGROUND OF THE INVENTION

Evolutionary and future wireless systems are expected to carry significantly higher levels of traffic than today's wireless networks. Consequently, there is a significant desire to increase the aggregate capacities of both the uplink and downlink channels as much as possible. One technique that has been proposed for increasing uplink capacity is synchronous code division multiple access (S-CDMA). In this form of CDMA, all active users transmit data with synchronized, variable-length orthogonal spreading codes. This essentially removes intra-cell interference, thereby allowing users to transmit with less power while still achieving the same power versus noise requirements at the receiver. The reduction in transmission power for each user results in less overall interference.

In S-CDMA, there are a limited number of synchronous orthogonal spreading codes available for use for uplink transmissions. Hence, in order to maximize uplink capacity, it is desirable to allocate an orthogonal code to a user only when that user actually has data to transmit. This then implies the need for users to have the capability to quickly signal the resource control mechanism when uplink transmission resources are required. A previously proposed method for accomplishing this is the System Access Channel (SACH), which is a dedicated low bit rate channel allocated to all active users, and which may be used to send short signaling messages, such as idle messages when there is no data to send and transmission request messages when there is data to send. In the S-CDMA infrastructure, the spreading codes used in these SACHs are not orthogonal to those used in the data channels, thus, the SACHs and data channels interfere with one another. Since CDMA and S-CDMA are essentially interference-limited technologies, system capacity decreases as interference increases. Accordingly, there is a need for a way to minimize the interference between the data channels and SACHs to allow increased capacity while maintaining a relatively low transmission power.

SUMMARY OF THE INVENTION

The present invention uses a portion of an orthogonal spreading code space in a CDMA spectrum for system access signaling from a user element to a base station. By assigning the user elements one or more signaling codes, which are orthogonal to those used to spread data, to use for uplink signaling, the present invention significantly reduces interference between system access channels (SACHs), and between the data channels and the SACHs, while supporting additional capacity. The signaling codes may be individually assigned to user elements or assigned to groups of user elements. Further, different length signaling codes may be assigned to the user elements to support different signaling rates depending on Quality of Service (QoS) requirements.

In one embodiment, SACHs are included within the S-CDMA framework in order to decrease interference, as well as reduce the necessary transmission power for both SACHs and data channels. The SACH orthogonalization can be performed in two ways. In the first approach, all SACHs would share one or more common orthogonal variable spreading factor (OVSF) codes. In the second approach, individual SACHs would be assigned individually dedicated OVSF codes. The resulting orthogonalization causes a noticeable increase in potential system capacity, both in terms of the maximum achievable aggregate data throughput and the number of SACHs that can be supported.

The use of OVSF codes for the SACHs also allows variable rate signaling to be easily included in the overall design. The signaling information is typically spread first by a spreading sequence, and then by an OVSF code. Depending upon the spreading sequence length, the OVSF code length, or a combination thereof assigned to a specific user element, different user elements can be assigned different signaling rates according to their relative priorities of service. For example, one user element might be allowed to use a signaling rate of 100 Hz, while a second, higher-priority user element would be allowed a faster signaling rate of 200 Hz. Additionally, a user element may be permitted to adjust its spreading rate when it has an active message to send. That is, the user element may signal at a low rate when it has no data to send, and then switch to a higher signaling rate when data is present and transmission resources must be requested. Further, user elements may support multiple SACHs defined in part by an OVSF code, wherein one or more SACHs may be employed at any given time based on signaling needs.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention uses a portion of an orthogonal spreading code space in the code division multiple access (CDMA) spectrum for system access signaling from a user element to a base station. Traditionally, only uplink data channels used orthogonal codes, and system access signaling was encoded in a different manner than the data channels. The codes used to spread the system access signaling information were not orthogonal to those used to spread the data. By assigning the user elements one or more signaling codes that are orthogonal to those used to spread the data to use for system access signaling, the present invention significantly reduces interference between SACHs, and between the data channels and the SACHs, while supporting additional capacity. The signaling codes may be individually assigned to user elements or assigned to groups of user elements. Further, different length signaling codes may be assigned to the user elements to support different signaling rates depending on Quality of Service (QoS) requirements. In one embodiment, the present invention uses a portion of the orthogonal variable spreading factor (OVSF) code space in the synchronous code division multiple access (S-CDMA) spectrum for uplink system access signaling from a user element to a base station.

Figure 1:
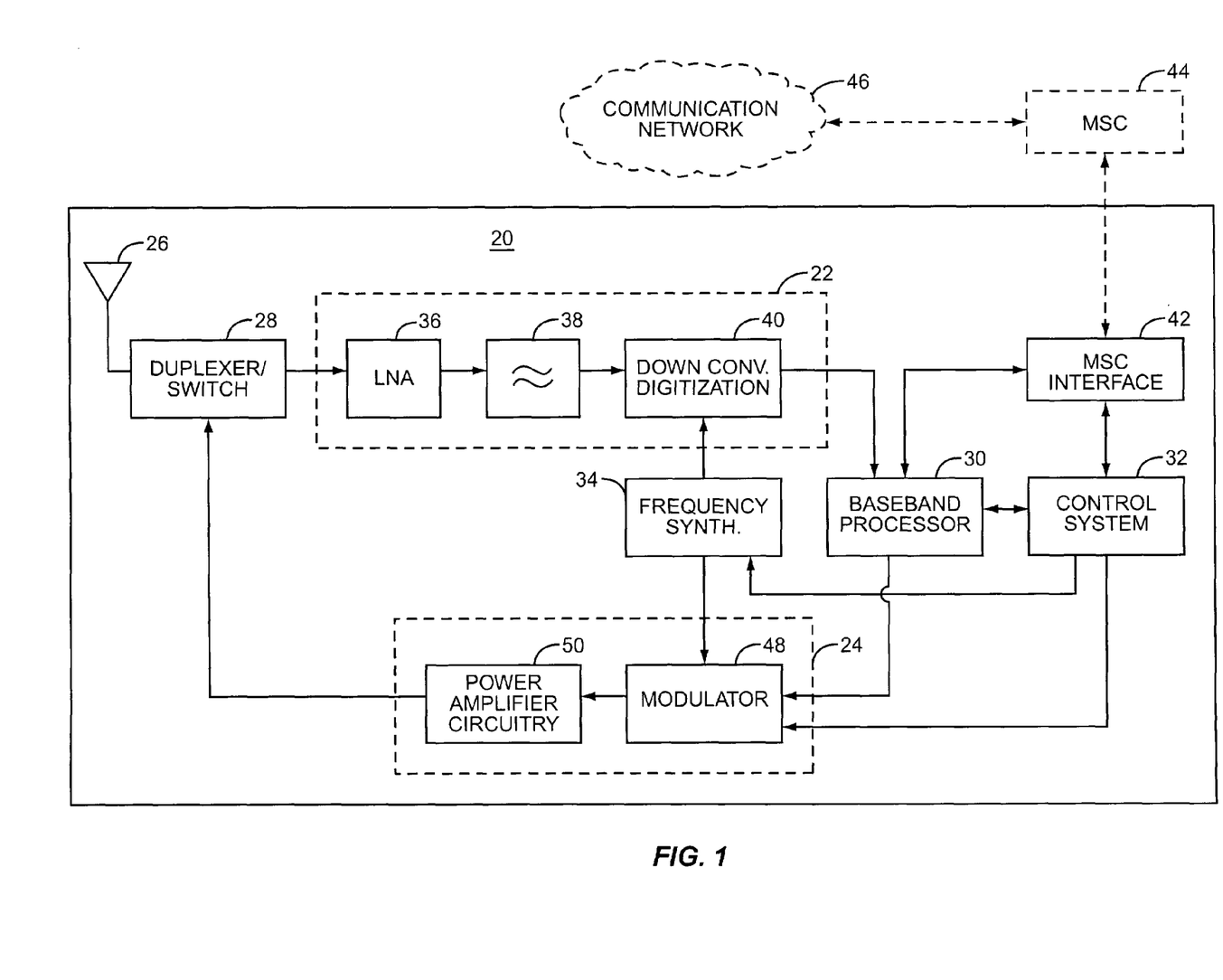
FIG. 1 is a logical representation of a base station configured according to one embodiment of the present invention.
Figure 2:
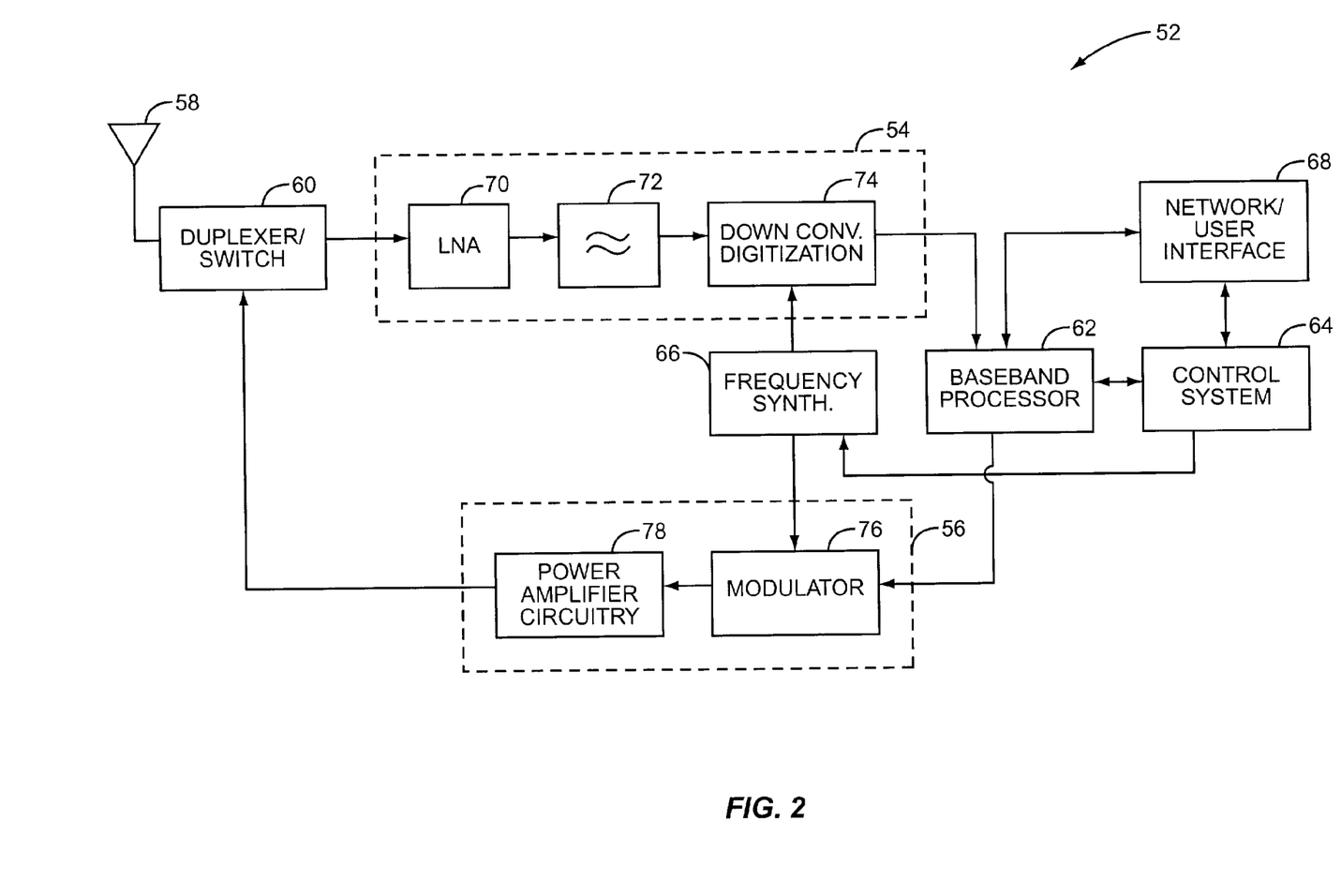
FIG. 2 is a logical representation of a user element configured according to one embodiment of the present invention.

Prior to delving into the detailed operation of the present invention, high level overviews of the architectures for a base station and user element are provided in FIGS. 1 and 2, respectively. FIG. 1 is a block diagram of a base station 20 configured according to one embodiment of the present invention. The base station 20 is configured to facilitate S-CDMA communications with user elements, such as a mobile telephone, personal digital assistant, wireless modem, or the like, in both downlink and uplink communications, wherein the downlink represents communications from the base station 20 to the user element and the uplink represents communications from the user element to the base station.

The base station 20 is typically configured to include a receiver front end 22, a radio frequency (RF) transmitter section 24, an antenna 26, a duplexer or switch 28, a baseband processor 30, a control system 32, and a frequency synthesizer 34. The receiver front end 22 receives an information-bearing RF signal from one or more user elements, such as mobile telephones, wireless personal digital assistants, or like wireless communication devices. A low noise amplifier 36 amplifies the RF signal. A filter circuit 38 minimizes broadband interference in the received signal, while downconversion and digitization circuitry 40 downconverts the filtered, received signal to an intermediate or baseband frequency signal, which is then digitized into one or more digital streams. The receiver front end 22 and RF transmitter section 24 typically use one or more frequencies generated by the frequency synthesizer 34.

The baseband processor 30 processes the digitized received signal to extract the information or data bits conveyed in the received signal. This processing typically comprises demodulation, despreading, decoding, error correction, and inference cancellation operations. As such, the baseband processor 30 is generally implemented in one or more digital signal processors (DSPs), application specific integrated circuits (ASICs), and field programmable gate arrays (FPGAs). Further detail regarding the operation of the baseband processor 30 is described in greater detail below.

The information conveyed in the received signal is typically either data or signaling information. Incoming data is directed to a mobile switching center (MSC) interface 42, which will forward the information to a supporting MSC 44. The MSC 44 facilitates communications with a variety of associated devices via a communication network 46, which may support wired or wireless circuit-switched or packet-switched communications. Signaling information is passed on to the control system 32 and used to assist communications with the user element as discussed below in further detail.

On the transmit side, data to be transmitted to the user element is received via the MSC interface 42 and provided to the baseband processor 30. The baseband processor 30 encodes and spreads the digitized data, which may represent voice or data, from the MSC interface 42 and signaling information from the control system 32. The encoded and spread data and signaling information is output to the transmitter 24, where it is used by a modulator 48 to modulate a carrier signal that is at a desired transmit frequency. Power amplifier circuitry 50 amplifies the modulated carrier signal to a level appropriate for transmission, and delivers the modulated carrier signal to the antenna 26.

The basic architecture of a user element, which is generally referenced as 52, is represented in FIG. 2 and may include a receiver front end 54, a RF transmitter section 56, an antenna 58, a duplexer or switch 60, a baseband processor 62, a control system 64, a frequency synthesizer 66, and a user interface 68. The receiver front end 54 receives information bearing radio frequency signals from one or more remote transmitters provided by a base station 20. A low noise amplifier 70 amplifies the received signals. A filter circuit 72 minimizes broadband interference in the received signal, while downconversion and digitization circuitry 74 downconverts the filtered, received signal to an intermediate or baseband frequency signal, which is then digitized into one or more digital streams. The receiver front end 54 and RF transmitter section 56 typically use one or more frequencies generated by the frequency synthesizer 66.

The baseband processor 62 processes the digitized received signal to extract the information or data bits conveyed in the received signal. This processing typically comprises demodulation, despreading, decoding, error correction, and interference cancellation operations. The baseband processor 62 is generally implemented in one or more DSPs, ASICs, and FPGAs.

The information conveyed in the received signal is typically either data or signaling information. Received data is directed to a network/user interface 68, which may provide a data interface for computing applications or a voice interface for telephony applications. Signaling information is passed on to the control system 64 and used to assist communications with the base station 20 as discussed below in further detail.

On the transmit side, data to be transmitted to the base station 20 is received via the network/user interface 68 and provided to the baseband processor 62. The baseband processor 62 encodes and spreads the digitized data, which may represent voice or data, from the network/user interface 68 and signaling information from the control system 64 for delivery to the base station 20. The encoded and spread data and signaling information is output to the RF transmit section 56, where it is used by a modulator 76 to modulate a carrier signal that is at a desired transmit frequency. Power amplifier circuitry 78 amplifies the modulated carrier signal to a level appropriate for transmission, and delivers the modulated carrier signal to the antenna 58.

As discussed, the above base station and user element architectures facilitate communications using a CDMA technique, and in particular using a modified form of S-CDMA according to the present invention. As those skilled in the art will appreciate, CDMA is a multiple access communication technology wherein each bit of data to be transmitted is multiplied by a multi-bit spreading code, which defines a channel between the transmitter and receiver. The code used to spread the data to be transmitted must be used at the receiver to recover the data. Each bit of the spreading code is referred to as a chip. The number of channels available in a CDMA system is generally a function of the number of unique spreading codes and the amount of interference caused by transmissions in other channels. The CDMA channel spectrum can be divided into two primary sections. The first section is for data transmission, while the second is for signaling, which is used between the base station 20 and the user element 52 to control data transmission.

Given the desire to increase the number of users and data rates supported by CDMA, numerous techniques have been employed to increase capacity by minimizing interference. The first is to control the transmission power from each of the many user elements 52 that are transmitting to the base station 20, such that all user elements 52 are transmitting at the minimum power levels necessary to support uplink communications. A second technique used to minimize interference caused by competing channels is to use spreading codes that are mutually orthogonal to one another. Accordingly, each user element 52 is assigned one or more orthogonal spreading codes with which to spread data for transmission. Since the spreading codes are orthogonal, user elements 52 with different, yet mutually orthogonal, spreading codes do not interfere with one another. Notably, maintaining orthogonality among user elements 52 requires synchronization among user elements 52, since the orthogonal spreading codes are orthogonal only if they are aligned in time.

An important set of orthogonal spreading codes is the Walsh set, which is generated using an iterative process of constructing a Hadamard matrix, which is well known to those skilled in the art. So-called Walsh-Hadamard spreading codes are important because they form a basis for a mutually orthogonal code set, wherein codes within the code set have different lengths, and thus different spreading factors. Since the spreading factor has a direct input on the actual data rate, orthogonal spreading codes with different spreading factors support different data rates. The data rates change because the actual chip rate in either the base station or user element architectures remains the same, although the rate at which data or signaling bits are spread will vary depending on the length or number of chips in each of the orthogonal spreading codes. Spreading codes of different lengths that remain orthogonal to one another are generally referred to as orthogonal variable spreading factor (OVSF) codes.

Traditional S-CDMA systems employ OVSF codes only in the uplink data channels that support variable data rates. The SACHs typically use very long pseudo-noise (PN) codes, which are prone to interfere with the data channels, and thus reduce overall capacity or increase the amount of power necessary to overcome such interference. Separate PN codes having a very long length and very high spreading factor are routinely assigned by the base station 20 to the user elements 52 to facilitate uplink signaling over what is referred to as a signaling access channel (SACH). In addition to interfering with the uplink data channels, the use of a PN code to define a SACH inherently builds in excessive delays in uplink signaling due to the length of the PN code. In a system requiring high quality of service levels, uplink signaling delays negatively impact quality of service levels.

To minimize the impact of the SACHs on the data channels, the present invention defines the SACHs within the orthogonal framework that defines the data channels. As such, the data channels and the SACHs are defined using spreading codes from a mutually orthogonal code set, such as an OVSF code set, wherein all spreading codes therein, regardless of length, are orthogonal to one another, assuming synchronization is maintained. Since the SACHs have signaling rates that are orders of magnitude less than the data rates associated with the data channels, various techniques may be employed to facilitate these lower signaling rates. Further, since any OVSF code set has a finite number of orthogonal spreading codes available, the present invention provides techniques for minimizing the number of OVSF codes necessary to facilitate signaling and retain a sufficient number of OVSF codes for the data channels.

In general, the OVSF codes for the data channels are significantly shorter in length than those for the SACHs. Given the nature of OVSF codes, the OVSF code set may have many relatively longer OVSF codes without significantly impacting the number of relatively shorter OVSF codes used for the data channels. The present invention takes advantage of these characteristics by assigning the longer OVSF codes of common or different lengths to one or more user elements 52 or groups thereof, as described below.

In a first embodiment, SACHs are included within the S-CDMA framework by assigning a single OVSF code to be shared by all SACHs. Accordingly, each user element 52 will use the same OVSF code for system access signaling. The single OVSF code serves to separate SACH transmissions from the various user elements 52 from the data transmissions, and thus, eliminates the SACH interference contribution to the data transmissions. Similarly, any interference from the data transmissions to the SACHs also disappears, due to the mutual orthogonality of the OVSF codes used for signaling and data transmissions. Within the shared OVSF code, individual SACHs are defined by an additional spreading process using unique PN spreading codes for each user element 52. The processing gain of one SACH over the other SACHs is reduced due to the two-step spreading process, but the reduction in processing gain is more than compensated for by the elimination of interference from the data channels.

Figure 3:
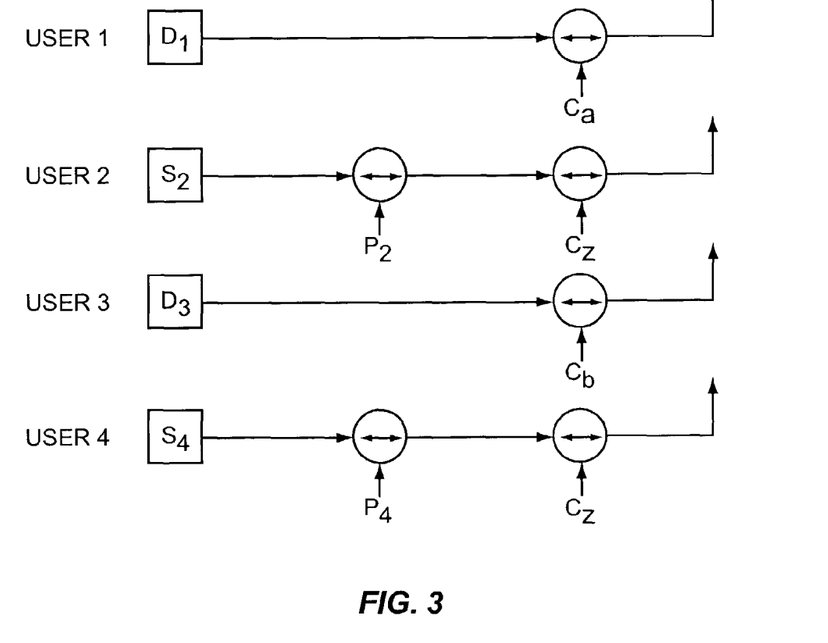
FIG. 3 illustrates sharing an OVSF code among multiple user elements according to one embodiment of the present invention.

The above approach is illustrated in FIG. 3, wherein transmissions from four unique user elements 52 are illustrated. Assume that users 1 through 4 are unique user elements 52 wherein users 1 and 3 are actively transmitting data on separate data channels, and users 2 and 4 are in an idle state, which requires signaling information to be periodically sent to the base station 20 over a SACH. Notably, the circles with bi-directional arrows indicate a spreading operation. As illustrated, data sources $D_1$ and $D_3$ from users 1 and 3 are spread with OVSF codes $C_a$ and $C_b$, respectively. The SACHs have a much lower throughput rate than the data channels, and are therefore first spread with unique PN codes, $P_2$ and $P_4$, to separate the individual SACHs, and are then further spread using the shared OVSF code $C_z$. Thus, a single OVSF code can be used by multiple user elements 52 wherein channel separation is provided by unique spreading codes, such as PN codes, which may be assigned by the base station 20 or may be innate to the user element 52. The orthogonality between the OVSF codes used for signaling and data codes used for data significantly reduces interference between the data channels and the SACH.

Figure 4:
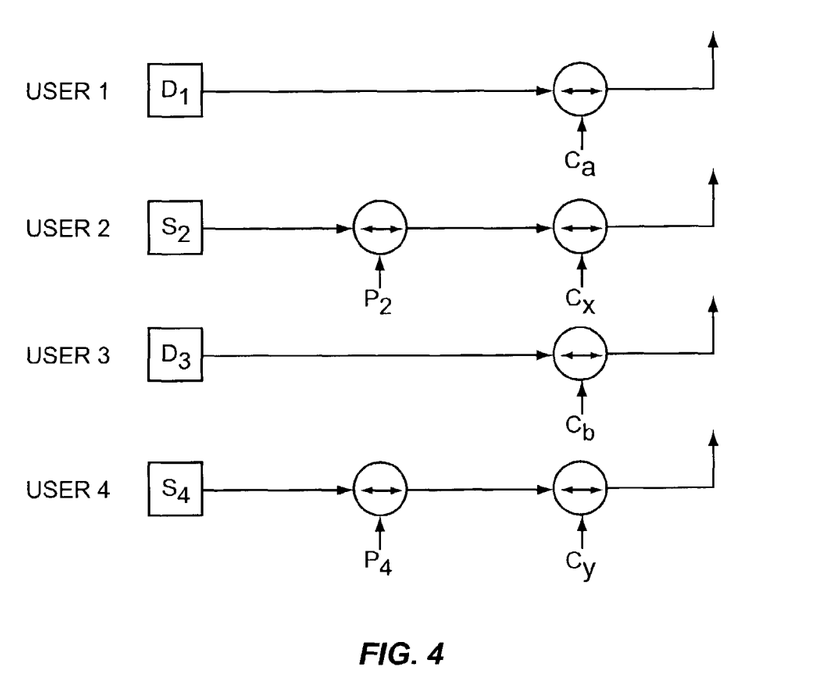
FIG. 4 illustrates using different OVSF codes for different user elements according to one embodiment of the present invention.

In another embodiment as illustrated in FIG. 4, unique OVSF codes are assigned for each SACH. Thus, each user element 52 will have a unique OVSF code assigned to it for signaling, wherein the OVSF code defines a unique SACH. Although it may appear undesirable to allocate a dedicated OVSF code for a specific application or user element 52 due to limitations in the number of codes available in the OVSF code set, the SACHs have a very low throughput rate, and can thus use relatively long OVSF codes. The length of these OVSF codes for the SACHs results in only a very small portion of the OVSF code space actually being used for signaling. Thus, there is a minimal impact on the OVSF code set with such an approach. As illustrated, users 1 and 3 are actively transmitting data spread by OVSF codes $C_a$ and $C_b$, respectively. Users 2 and 4 are in an idle state and will provide signaling to the base station 20 by first spreading the signaling bit or bits to an appropriate length with a spreading sequence, such as a PN code or a simple bit repetition, and then further spread the result by an individually assigned OVSF code, $C_x$ and $C_y$, respectively. By providing unique OVSF codes for each SACH, none of the data channels or SACHs will interfere with each other. The first spreading operation using the spreading sequence is normally preferred since simple spreading by very long OVSF codes would still result in a data rate that is too high for typical signaling requirements in existing CDMA architectures. Accordingly, the first spreading process is optional, but preferred in order to keep the OVSF codes within a reasonable length, the signaling throughput rates within system requirements, and the SACH transmission power levels low to minimize interference to adjacent cells.

Figure 5:
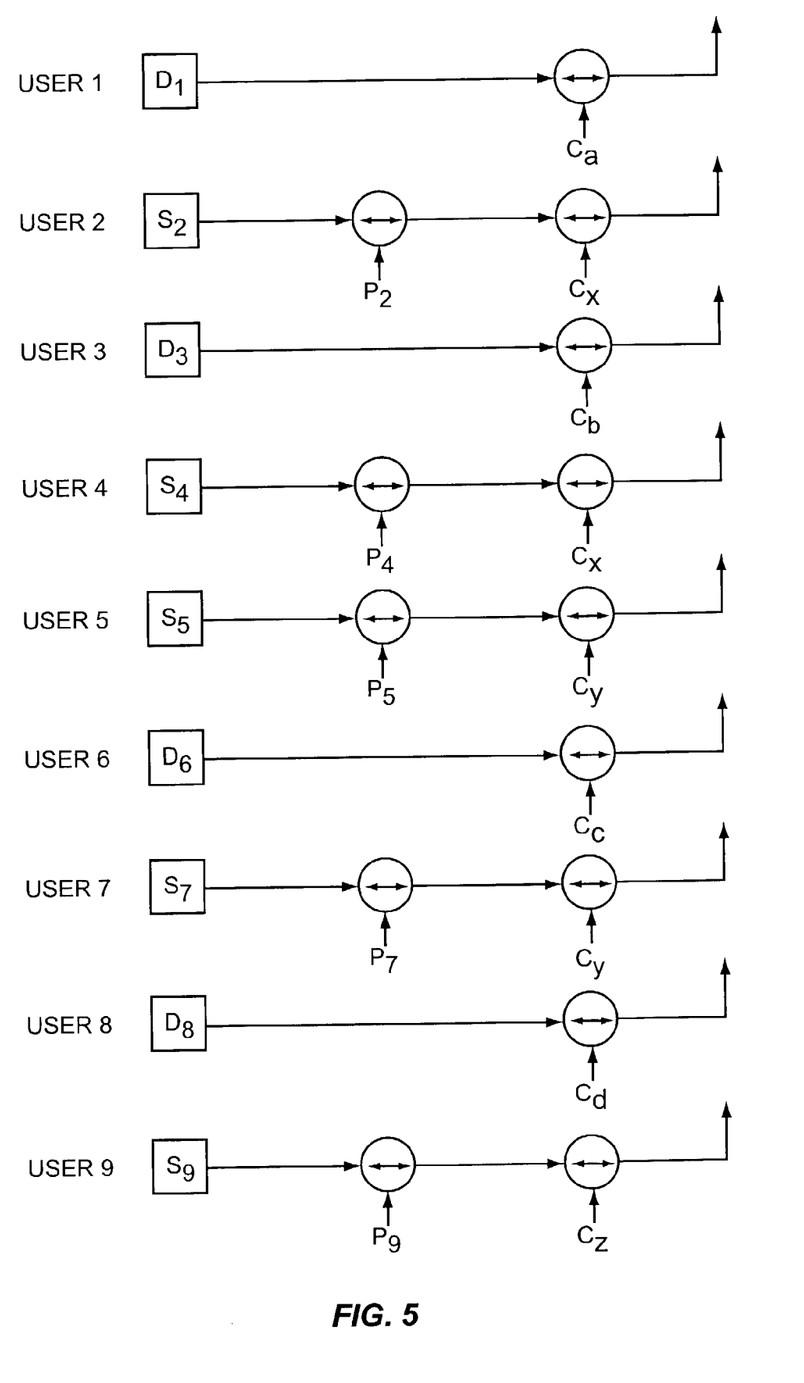
FIG. 5 illustrates using different OVSF codes for different groups of user elements according to one embodiment of the present invention.

In another embodiment of the present invention, different groups of user elements 52 are assigned OVSF codes. As such, each user element 52 within a group will have the same OVSF code as other user elements 52 in the group, but a different OVSF code than user elements 52 in another group. The OVSF code assigning is a combination of the first two embodiments, and is illustrated in FIG. 5, wherein there are nine users illustrated (users 1 through 9). Users 1, 3, 6, and 8 are all active users transmitting data spread using uniquely assigned OVSF codes $C_a$, $C_b$, $C_c$, and $C_d$, respectively. The remaining users, users 2, 4, 5, 7, and 9, are idle and transmit signaling information as follows. Assume that users 2 and 4 form one group and users 5 and 7 form another group. The group for users 2 and 4 shares an OVSF code $C_x$, while the group for users 5 and 7 shares an OVSF code $C_y$. The remaining user 9 has a uniquely assigned OVSF code $C_z$. During signaling, users 2 and 4 will spread the signaling information using a spreading sequence, such as PN codes or bit repetitions, $P_2$ and $P_4$, respectively, and then further spread the result with the OVSF code $C_x$. Similarly, users 5 and 7 will initially spread the signaling information using spreading sequences $P_5$ and $P_7$, respectively, and then spread the result using the OVSF code $C_y$. User 9 will initially spread the signaling information using a spreading sequence $P_9$, and then spread the result using an OVSF code $C_z$. As such, user elements 52 within a group can employ common OVSF codes, and the SACHs within any given group are uniquely identified by the spreading sequence used in the initial spreading. Different OVSF codes can be assigned to different groups of user elements 52. Those skilled in the art will recognize the flexibility in assigning OVSF codes to individual user elements 52 or groups thereof. Preferably, the base station 20 will periodically assign the OVSF codes to the user elements 52 or groups thereof via downlink signaling.

Within the above embodiments, different length OVSF codes may be assigned to any given user element 52 or group thereof based on the rate at which associated channel conditions are changing or a desired signaling throughput rate. Accordingly, one user element 52 or group thereof may be assigned a relatively longer OVSF code, while another user element 52 or group thereof may be assigned a relatively shorter OVSF code. For example, changing channel conditions may impact the orthogonality of the various data channels and SACHs. As the OVSF code increases in length, the likelihood of changing channel conditions impacting orthogonality of that channel increases. Thus, mobile user elements 52 or those experiencing changing channel conditions may be assigned shorter OVSF codes, while user elements 52 with relatively static channel conditions may be assigned longer OVSF codes. As an example, the shorter OVSF codes may have a length between 8 and 256 chips, while the longer OVSF codes may have a length between 512 and 4096 chips. Further, the relative length of these OVSF codes may incrementally change depending on the degree of channel variations. Likewise, user elements 52 or groups thereof requiring higher signaling rates can be assigned shorter OVSF codes, and vice versa. Notably, the amount of preliminary spreading using the spreading sequences plays a significant role in overall throughput rates, and those skilled in the art will recognize the interplay between the initial spreading factor and the length of the OVSF codes used in the second spreading process.

Figure 6:
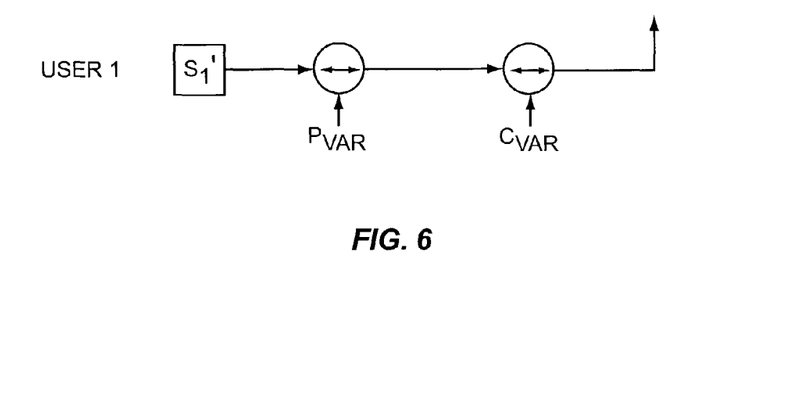
FIG. 6 illustrates using varying signaling rates and varying OVSF codes in a single user element according to one embodiment of the present invention.

In addition to having different OVSF code lengths, signaling rates, or a combination thereof for different user elements 52 or groups thereof, individual user elements 52 can be assigned multiple OVSF codes of different lengths. As such, variable rate signaling for a single user element 52 is facilitated, wherein the user element 52 may use a shorter OVSF code for higher signaling rates and a longer OVSF code for slower signaling rates, as illustrated in FIG. 6. As depicted, user 1 is signaling over an SACH defined by an OVSF code, $C_{VAR}$, which may vary depending on the application. The optional initial spreading step, using a variable spreading sequence, $P_{VAR}$, may be used as well to control signaling rates or identify the user element 52 if a group of user elements 52 is sharing the OVSF code $C_{VAR}$. The change in signaling rate can be accomplished by changing the SACH OVSF code length or by increasing the amount of spreading that occurs prior to the OVSF code spreading.

Accordingly, different terminals may be allowed to signal at different rates relative to one another, as well as signal at different rates at different times, for different applications, or for different types of messaging. Accordingly, different QoS levels can be provided to different user elements 52 or for different states for a single user element 52. For example, a user element 52 may use different signaling rates when transmitting idle and active messages. The idle message indicates that the user element 52 has no data to send, while an active message indicates that the user element 52 has data to send. Accordingly, a lower signaling rate can be provided for the idle message, while a higher signaling rate can be provided for the active message, such that the active message is received by the base station 20 faster than an idle message. As noted above, the signaling rate is a function of the initial spreading or bit repetition function, as well as the spreading by the OVSF code due to the OVSF code length.

Such variable rate signaling within a single user element 52 will allow the user element 52 to lower its transmission power and create less interference when lower signaling rates are sufficient. When an active message must be sent to the base station 20, the user element 52 may switch to a higher signaling rate or increase its transmission power in order to be noticed more quickly by the base station 20. In fact, since a user element 52 would likely switch from an idle message to an active message and remain there until acknowledged by the base station 20, the user element 52 may switch to the active message in the middle of transmitting an idle message. The switch should occur on the boundary of the corresponding OVSF code to maintain orthogonality with other SACHs and data channels.

Figure 7:
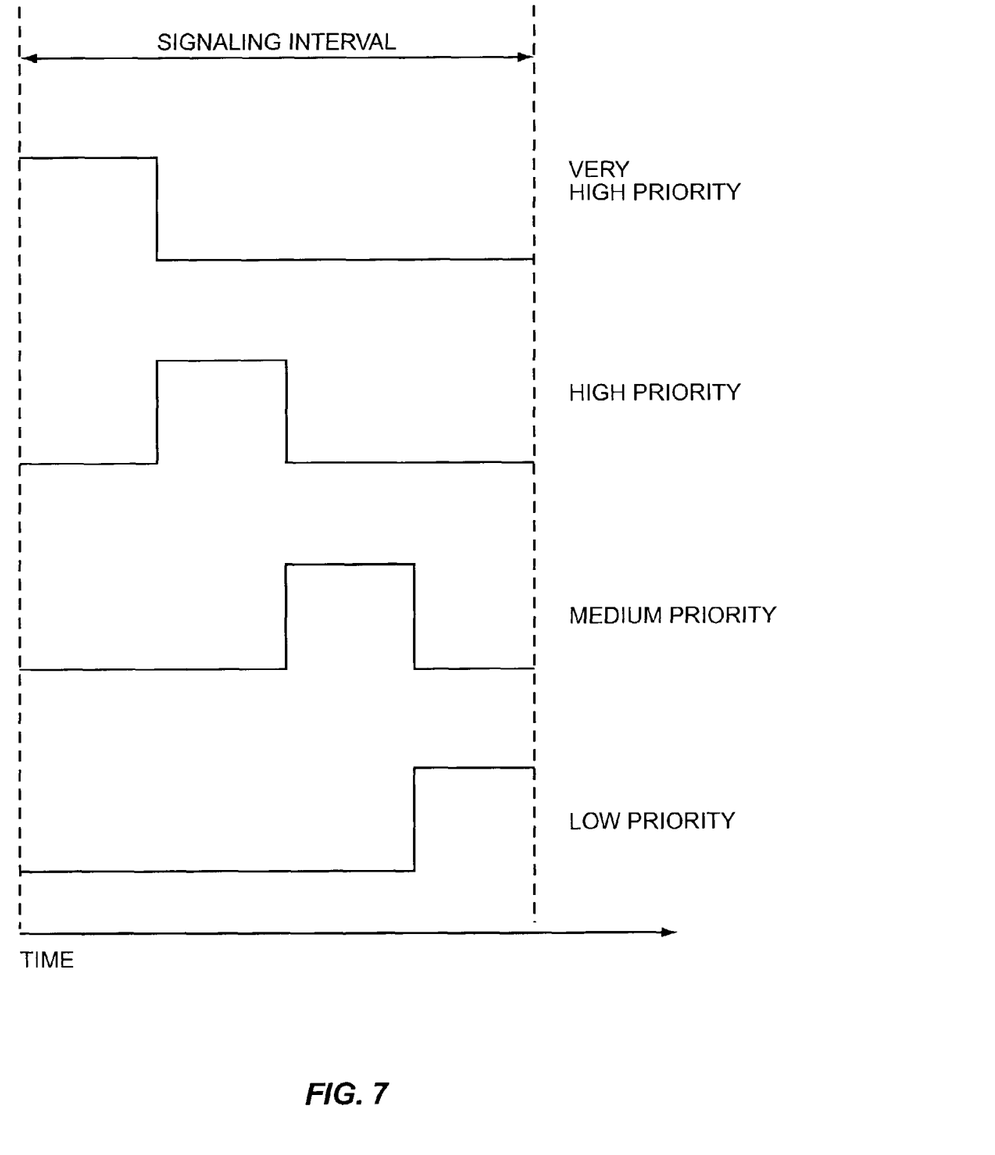
FIG. 7 illustrates prioritizing signaling within a signaling interval.

As illustrated in FIG. 7, the relative position of the active message within the signaling period may be used to signal a priority level of the transmission request, or other relevant information, to the base station 20. Those messages sent at the beginning of the signaling interval are treated with very high priority, while those received at the end of the signaling interval are treated with low priority. Multiple levels of priority may be provided within the signaling interval.

Figure 8:
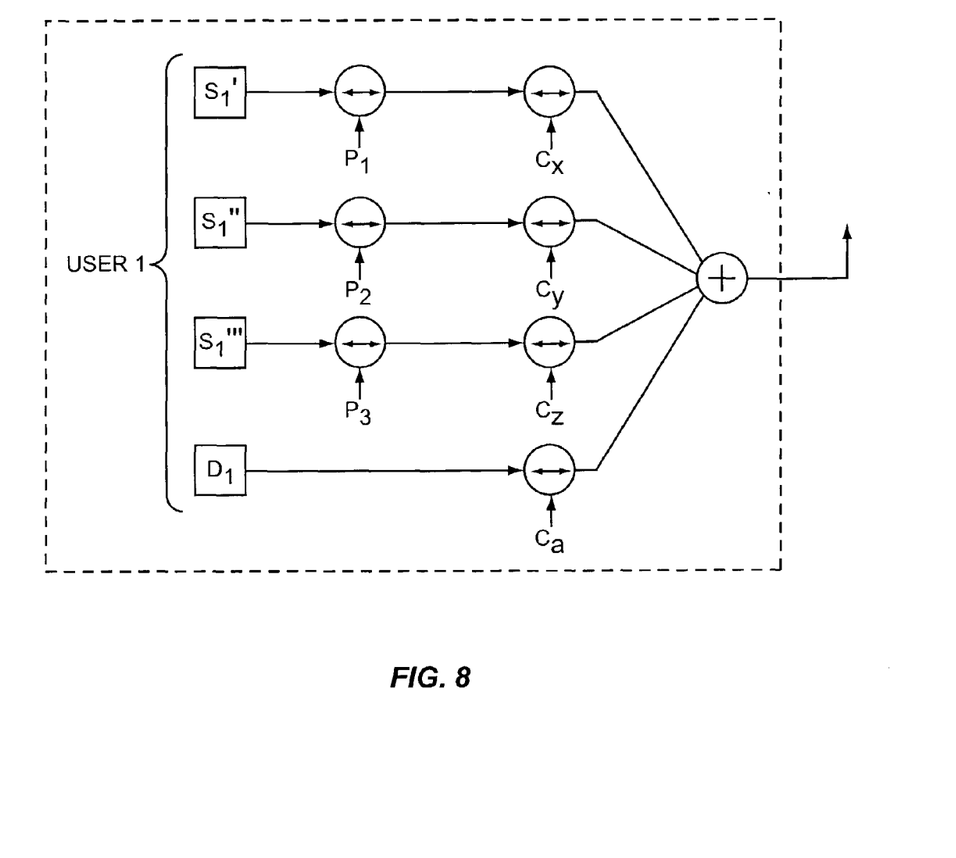
FIG. 8 illustrates using multiple OVSF codes in a single user element according to one embodiment of the present invention.

Each user element 52 may be assigned multiple OVSF codes to use separately or simultaneously. These different OVSF codes may have different lengths and may be associated with different signaling rates, depending on the associated spreading. Further, the different OVSF codes assigned to different user elements 52 may be used to send different signaling messages, or to simply increase the effective signaling rate. With reference to FIG. 8, a single user element 52, referenced again as user 1, may have several possible SACHs, $S_1'$, $S_1''$, and $S_1'''$, as well as a data channel, $D_1$. Each of the SACHs, $S_1'$, $S_1''$, and $S_1'''$, can be associated with different OVSF codes of the same or different lengths. As with the above embodiments, signaling information may or may not be spread by an initial spreading process using a spreading sequence. These spreading sequences may be the same or different depending on the embodiment, and may function to control the signaling rate or help identify the different channels depending on whether or not the OVSF spreading codes $C_x$, $C_y$, $C_z$ are shared with other user elements 52. In this embodiment, different signaling information can be provided in each of the SACHs simultaneously, wherein information spread by the initial spreading process and the OVSF codes are summed together, potentially with the data channel, and transmitted. The base station 20 will be able to separately identify the SACHs and data channel using the respective OVSF codes. In such an embodiment, basic messaging requiring a slower signaling rate, such as that used for reporting an idle state, may use one SACH, $S_1'$, while the remaining SACHs, $S_1''$ and $S_1'''$, are not used and therefore do not contribute to intercell interference. If multiple messages or higher signaling rates are required to convey an active message, or additional information such as the amount of information that is going to be sent or the number of resources required, the other SACHs can be simultaneously invoked.

Based on the above, the present invention proposes the inclusion of SACHs within the S-CDMA framework in order to decrease intracell interference, as well as reduce the necessary transmission power for both SACHs and data channels, which will decrease intercell interference. The SACH orthogonalization can be performed in two ways. In the first approach, all SACHs would share one or more common OVSF codes. In the second approach, individual SACHs would be assigned individually dedicated OVSF codes. The resulting orthogonalization causes a noticeable increase in potential system capacity, both in terms of the maximum achievable aggregate data throughput and the number of SACHs that can be supported.

The use of OVSF codes for the SACHs also allows variable rate signaling to be easily included in the overall design. The signaling information is typically spread first by a PN code or simple bit repetition, and then by an OVSF code. Depending upon the amount of spreading, the OVSF code length, or a combination thereof assigned to a specific user element 52, different user elements 52 can be assigned different signaling rates according to their relative priorities of service. For example, one user element 52 might be allowed to use a signaling rate of 100 Hz, while a second, higher-priority user element 52 would be allowed a faster signaling rate of 200 Hz. Additionally, a user element 52 may be permitted to adjust its spreading rate when it has an active message to send. That is, the user element 52 may signal at a low rate when it has no data to send, and then switch to a higher signaling rate when data is present and transmission resources must be requested. Further, user elements 52 may support multiple SACHs defined in part by an OVSF code, wherein one or more SACHs may be employed at any given time based on signaling needs.

Those skilled in the art will recognize improvements and modifications to the preferred embodiments of the present invention. All such improvements and modifications are considered within the scope of the concepts disclosed herein and the claims that follow.

What is claimed is:

1. A method for code division multiple access (CDMA) communication comprising:
   a) assigning a data code to a user element for the user element to use when transmitting data; and
   b) assigning a system access code to the user element for the user element to use when transmitting system access information, the data code and system access code being mutually orthogonal and respectively defining data and system access channels for the user element.

2. The method of claim 1 further comprising:
   c) recovering a data signal spread by the data code from the user element, the data signal including the data; and
   d) recovering a system access signal spread by the system access code from the user element, the system access signal including the system access information.

3. The method of claim 1 wherein the system access information from the user element is spread using a spreading sequence and then by the system access code prior to transmission and further comprising recovering a system access signal by despreading with the system access code and despreading with the spreading sequence.

4. The method of claim 3 wherein the spreading sequence is a pseudo-noise code.

5. The method of claim 3 wherein the spreading sequence is a bit repetition sequence.

6. The method of claim 1 wherein assigning the system access code further comprises assigning the system access code to a plurality of user elements for the user elements to use when transmitting the system access information, the data code and the system access code being mutually orthogonal and respectively defining data and system access channels for the user elements.

7. The method of claim 6 wherein the system access information from each of the plurality of user elements is spread using a unique spreading sequence and then by the system access code prior to transmission and further comprising recovering a system access signal by despreading with the system access code and then despreading with the unique spreading sequence.

8. The method of claim 1 wherein assigning the system access code further comprises assigning a different one of a plurality of system access codes to each of a plurality of user elements for the user elements to use when transmitting the system access information, the data code and the plurality of system access codes being mutually orthogonal and respectively defining data and system access channels for the user elements.

9. The method of claim 1 wherein assigning the system access code further comprises assigning a different one of a plurality of system access codes to a plurality of groups of user elements for the user elements to use when transmitting the system access information, such that only user elements in a given group have a common system access code, which is mutually orthogonal with each of the plurality of system access codes and the data code and respectively defining data and system access channels for the user elements.

10. The method of claim 1 wherein assigning the system access code further comprises assigning a first system access code for a relatively stationary user element and assigning a second system access code for a relatively mobile user element.

11. The method of claim 10 wherein the second system access code is shorter than the first system access code.

12. The method of claim 1 wherein a length of the system access code decreases relative to increased mobility of the user element.

13. The method of claim 1 wherein a length of the system access code increases relative to decreased mobility of the user element.

14. The method of claim 1 wherein the system access code can have one of a plurality of different code lengths and assigning the system access code further comprises assigning the system access code with one of the different code lengths.

15. The method of claim 14 wherein assigning the system access code further comprises assigning multiple system access codes to the user element wherein the system access codes have different code lengths to allow the user element to selectively provide system access at different rates.

16. The method of claim 14 wherein assigning the system access code further comprises assigning multiple system access codes to the user element wherein the system access codes have different code lengths and correspond to different system access messages.

17. The method of claim 1 wherein assigning the system access code further comprises assigning one of a plurality of system access codes having different code lengths to each of a plurality of user elements for the user elements to use when transmitting the system access information to allow variable system access rates from the plurality of user elements, the data code and the plurality of system access codes being mutually orthogonal and respectively defining data and system access channels for the user elements.

18. The method of claim 1 wherein system access signals can be transmitted during different periods within a system access interval and the period in which the system access signal is received bears on a priority level associated with the system access signal.

19. The method of claim 1 wherein the data code and the system access code are orthogonal variable spreading factor codes belonging to a mutually orthogonal code set.

20. The method of claim 1 wherein communications are facilitated using synchronous CDMA.

21. A system comprising:
a receiver configured to receive an information-bearing signal from a plurality of user elements;
a transmitter configured to transmit at least data and system access information at a transmit frequency to the plurality of user elements;
processing logic operably associated with the receiver and the transmitter, the receiver, transmitter and processing logic cooperatively configured to facilitate code division multiple access (CDMA) communication with the plurality of user elements by performing operations comprising:
assigning a data code to a user element for the user element to use when transmitting data; and
assigning a system access code to the user element for the user element to use when transmitting system access information, the data code and system access code being mutually orthogonal and respectively defining data and system access channels for the user element.

22. The system of claim 21 wherein the receiver, transmitter, and processing logic are further configured to perform operations comprising:
recovering a data signal spread by the data code from the user element, the data signal including the data; and
recovering a system access signal spread by the system access code from the user element, the system access signal including the system access information.

23. The system of claim 21 wherein the system access information from the user element is spread using a spreading sequence and then by the system access code prior to transmission and the receiver, transmitter, and processing logic are further configured to recover a system access signal by despreading with the system access code and despreading with the spreading sequence.

24. The system of claim 23 wherein the spreading sequence is a pseudo-noise code.

25. The system of claim 23 wherein the spreading sequence is a bit repetition sequence.

26. The system of claim 21 wherein the receiver, transmitter, and processing logic are further configured to perform operations comprising assigning the system access code to the plurality of user elements for the user elements to use when transmitting the system access information, the data code and the system access code being mutually orthogonal and respectively defining data and system access channels for the user elements.

27. The system of claim 21 wherein the system access information from each of the plurality of user elements is spread using a unique spreading sequence and then by the system access code prior to transmission and the receiver, transmitter, and processing logic are further adapted to recover a system access signal by despreading with the system access code and then despreading with the unique spreading sequence.

28. The system of claim 21 wherein the receiver, transmitter, and processing logic are further configured to perform operations comprising assigning a different one of a plurality of system access codes to each of the plurality of user elements for the user elements to use when transmitting the system access information, the data code and the plurality of system access codes being mutually orthogonal and respectively defining data and system access channels for the user elements.

29. The system of claim 21 wherein the receiver, transmitter, and processing logic are further configured to perform operations comprising assigning a different one of a plurality of system access codes to a plurality of groups of user elements for the user elements to use when transmitting the system access information, such that only user elements in a given group have a common system access code, which is mutually orthogonal with each of the plurality of system access codes and the data code and respectively defining data and system access channels for the user elements.

30. The system of claim 21 wherein the receiver, transmitter, and processing logic are further configured to perform operations comprising assigning a first system access code for a relatively stationary user element and assign a second system access code for a relatively mobile user element.

31. The system of claim 30 wherein the second system access code is shorter than the first system access code.

32. The system of claim 21 wherein a length of the system access code decreases relative to increased mobility of the user element.

33. The system of claim 21 wherein a length of the system access code increases relative to decreased mobility of the user element.

34. The system of claim 21 wherein the system access code can have one of a plurality of different code lengths and the receiver, transmitter, and processing logic are further adapted to assign the system access code with one of the different code lengths.

35. The system of claim 34 wherein the receiver, transmitter, and processing logic are further configured to perform operations comprising assigning multiple system access codes to the user element wherein the system access codes have different code lengths to allow the user element to selectively provide system access at different rates.

36. The system of claim 34 wherein the receiver, transmitter, and processing logic are further configured to perform operations comprising assigning multiple system access codes to the user element wherein the system access codes have different code lengths and correspond to different system access messages.

37. The system of claim 21 wherein the receiver, transmitter, and processing logic are further configured to perform operations comprising assigning one of a plurality of system access codes having different code lengths to each of the plurality of user elements for the user elements to use when transmitting the system access information to allow variable system access rates from the plurality of user elements, the data code and the plurality of system access codes being mutually orthogonal and respectively defining data and system access channels for the user elements.

38. The system of claim 21 wherein system access signals can be transmitted during different periods within a system access interval and a period in which the system access signal is received bears on a priority level associated with the system access signal.

39. The system of claim 21 wherein the data code and the system access code are orthogonal variable spreading factor codes belonging to a mutually orthogonal code set.

40. The system of claim 21 wherein communications are facilitated using synchronous CDMA.

\* \* \* \* \*